BEST AVAILABLE COPY

2 Sheets—Sheet 1.

J. H. ELWARD.

HARVESTER.

No. 7,144. Reissued May 30, 1876.

Orig Pat. 141866

INVENTOR

John H. Elward by A. M. Smith

ATTORNEY show ater

56- HARVESTERS.

EXAMINER'S ROOM.

2 Sheets—Sheet 2.

J. H. ELWARD.

HARVESTER.

No. 7,144. Reissued May 30, 1876.

WITNESSES

Alex Mahon

John G. Center

John H. Elward by A. M. Ritter

Attorney

N. PETERS, PHOTO-LITHOGRAPHER, WASHINGTON, D. C.

UNITED STATES PATENT OFFICE.

JOHN H. ELWARD, OF ST. PAUL, MINNESOTA.

IMPROVEMENT IN HARVESTERS.

Specification forming part of Letters Patent No. 141,866, dated August 19, 1873; reissue No. 7,144, dated May 30, 1876; application filed March 11, 1875.

*To all whom it may concern:*

Be it known that I, JOHN H. ELWARD, of St. Paul, county of Ramsey and State of Minnesota, have invented a new and useful Improvement in Harvesters, of which the following is a full, clear, and exact description, reference being had to the accompanying drawing, making part of this specification, in which—

Figure 1:
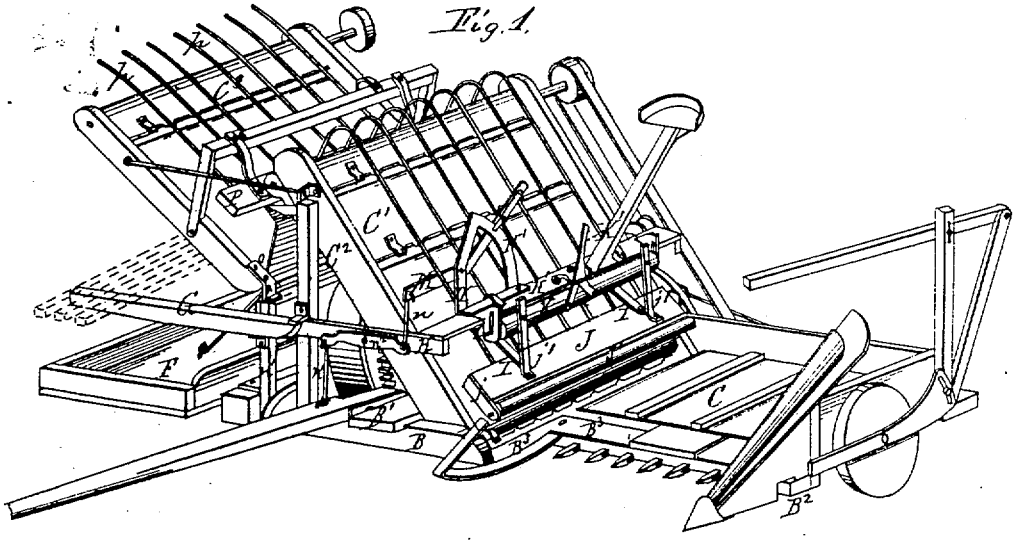
Figure 3:
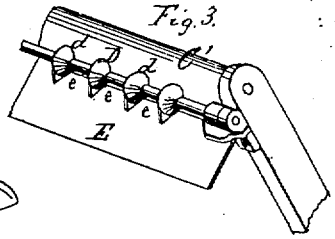
Figure 2:
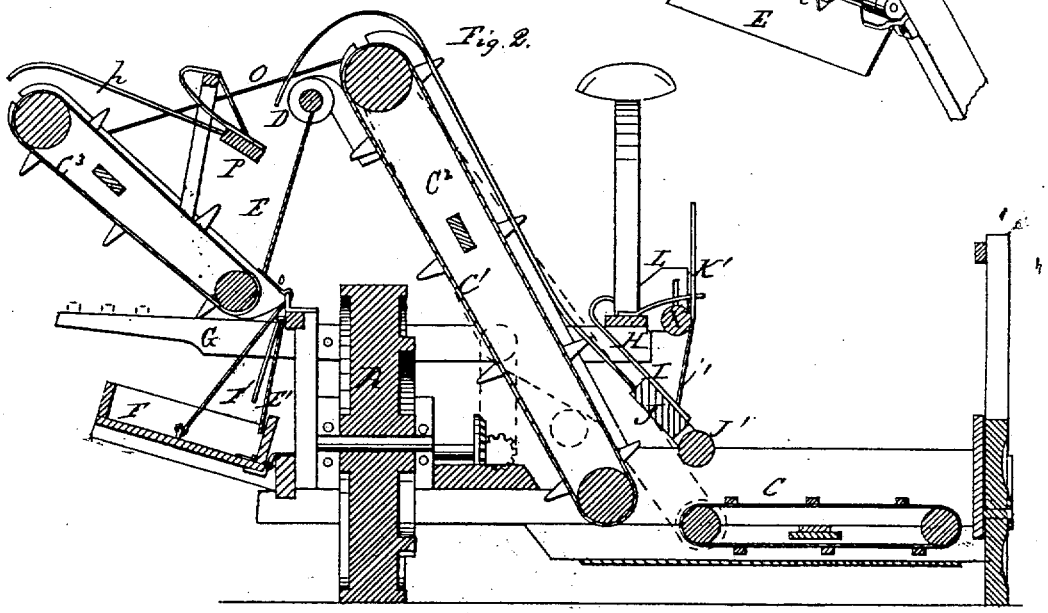
Figure 4:
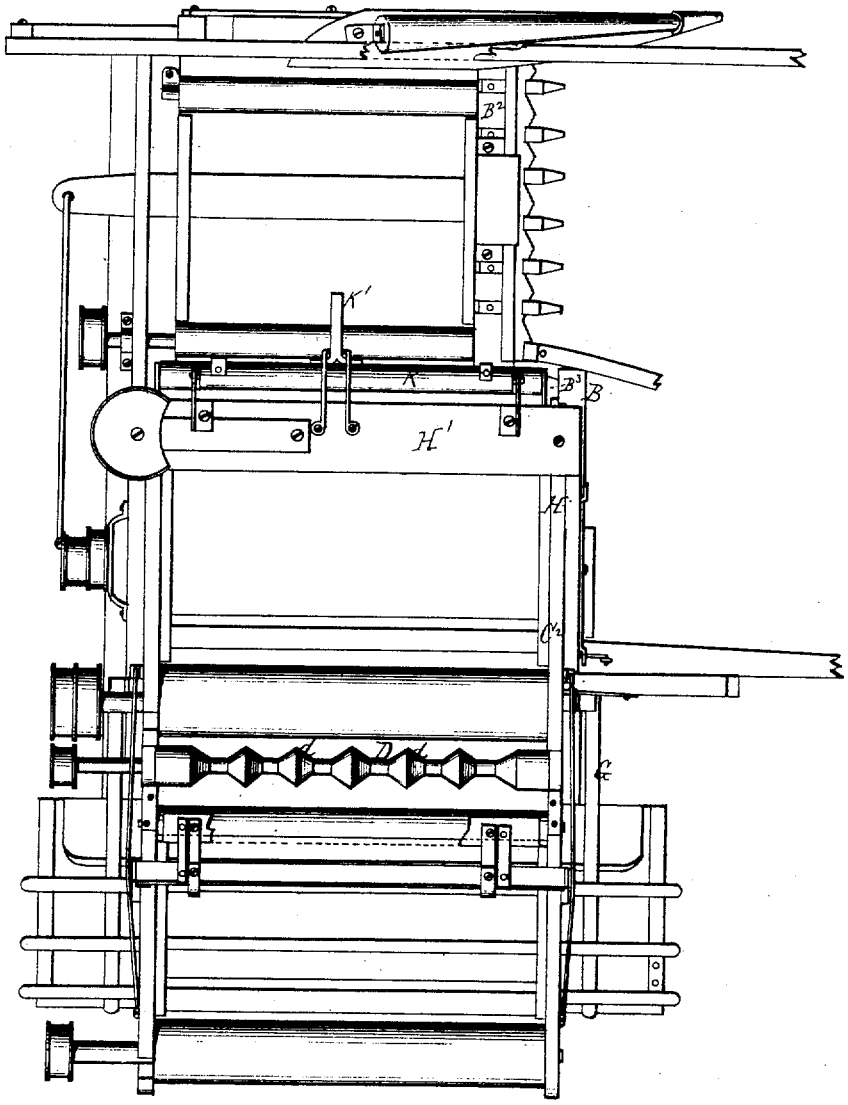

Figure 1 is a perspective view taken from the front grain side of a harvesting-machine embracing my improvements. Fig. 2 is a vertical transverse section of the same. Fig. 3 is a perspective view of a portion of the elevating-apron and delivery-shield, with intermediate discharging-rollers, and Fig. 4 is a plan or top view of the machine, partly broken away, and with the aprons removed, to show the construction of the elevator-frame and its relation to the platform-frame.

Similar letters of reference denote similar parts in all the figures.

My invention consists, first, in making the broad continuous elevator-apron of greater width than the platform-apron or carrier, and extending its forward edge in front of said platform-apron for clearing the overhanging butts of the grain and elevating the same, as hereinafter described; second, in the combination of a friction-roller, with the lower end of the yielding spring-board, which holds the grain down to the action of the elevating rake or apron for facilitating the entrance of the grain between said board and rake or apron, as hereinafter explained; third, in the combination of a lifting-roller with the yielding compressing-board, whereby either or both ends of said board may be raised; fourth, in combining a ribbed or corrugated discharging-roller with the notched slats of the elevator-apron; fifth, in the combination, with a machine provided with a receptacle for the shattered grain and short heads, of a second elevating-apron for taking the grain after it has been discharged from the first elevating-apron or rake, and delivering it into a cart or wagon by the side of the machine, whereby the grain, when too ripe, or otherwise not in fit condition to be bound, may be discharged into such cart or wagon, while at the same time the shattered grain is caught and saved; and, lastly, in certain details of construction and arrangement, all as hereinafter set forth.

In the accompanying drawing, A represents the driving-wheel; B $B^1$, the frame; $B^2$, the forward platform-bar; C, horizontal receiving-apron; $C^1$, the elevating-apron; D, the discharging-roller, for cleaning the rake-teeth at the point of delivery; E E′, the inclined delivery-shield, for receiving the grain and straw from the elevator apron or rake, and depositing it upon the receiving-fingers, or into the binders' platform and receptacle; F′, the receiving-fingers, shown turned down out of the way to accommodate a secondary elevating and discharging apron; G, overhanging pivoted arms, which, when the grain is bound upon the machine, support the longitudinal bars represented in dotted lines in the drawings.

Parts of the machine not hereinafter particularly referred to may be constructed and applied in any usual or desired manner.

The finger-bar $B^2$, or forward transverse bar of the platform-frame, is located at some distance in rear of and below the line of the forward main-frame bar B, and is connected therewith by a strong angular strap or shoe plate, $B^3$, secured to the lower face of the inner end of the frame-bar B, and to the upper face of the adjacent end of the platform or finger bar $B^2$, thus contracting the width of the platform-frame relatively to the main and elevator frames, and at the same time setting the finger-bar sufficiently below the frame-bar B to adapt it, although in rear of the latter to be depressed to the surface of the ground, for picking up lodged grain.

The main-frame bar B, at its inner end, is notched or recessed to receive the lower end of the elevator-frame $C^2$, in which the forward end of the elevator $C^1$, or of its actuating-roller, has its support or bearing, thus extending said elevator-frame and roller, together with the broad continuous elevator-apron mounted thereon, in front of the forward edge of the platform apron or carrier. This is important, from the fact that the barbed heads of the grain adhere more closely to the platform-apron, and are carried forward more rapidly. Reaching the elevator-apron in advance of the butts, and being there retarded until the butts

JS- HARVESTERS.

overtake them, the latter are swung forward and caused to overhang the forward edge of the platform-apron.

By extending the elevator-apron forward of the forward edge of the platform-apron, as described, all obstructing stationary surfaces are removed out of the way of the advancing butts of the grain, and by making the elevator in the form of the broad, continuous apron, as described, equality of movement in the elevation of the heads and butts is secured.

H H are seat-supporting bars, which overhang the inner or upper face of the elevator-apron $C^1$, and are connected by the longitudinal seat-plank H′, arranged over the apron, as shown. I I are flat springs, connected at their upper ends with the seat-plank, and at their lower ends with a spring bar or board, J, to which they afford a yielding support. This rod or bar J has connected to it a number of curved elastic or spring rods or wires, extending from its upper or rear edge upward and over the upper end of the elevating-apron $C^1$, as clearly shown in Fig. 2, these rods, together with the spring-bar J, serving to hold the grain properly to the action of the elevating-apron $C^1$. To the opposite or lower edge of the spring-board J I attach, by straps *j*, in any suitable manner, a roller, J′, which extends across the elevating-apron at or near its lower end, and is pivoted in straps *j* in such manner as to roll freely, and thus serves to facilitate the entrance of the grain underneath the spring-board J and yielding rods connected therewith, in a manner that will be readily understood. To the upper face of the spring-board J is attached the lower ends of straps, chains, or cords *j*′, the upper ends of which are connected with a lifting roller, K, the pivot or shaft of which has its bearings in slotted brackets L, attached either directly to the seat-plank H′, as shown, or to a longitudinal bar lying parallel with said seat-plank, and connected therewith by a central transverse pivot, mounted in the seat-plank at or about midway of its length. Where this latter construction is adopted the supporting-brackets L need not be slotted, as the vibration of supporting-bar or lifting-roller K is thus provided for. The lifting-roller K has a lever, K′, rigidly connected with it, so arranged that the attendant, by simply vibrating said lever inward toward the elevator-apron $C^1$, can rock or roll the lifting-roller K in its bearings, and thus, through its connection with the spring-board J and roller J′, raise the said board and roller bodily for relieving the elevating-apron from any undue accumulation of grain, which would interfere with its perfect action; or, by vibrating said lever forward or backward, either on its transverse pivotal connection with the seat-plank, or by raising one end in its slotted pivotal support, as explained, can raise either end of the spring-board independently of the other for freeing either end of said board, or of the elevator-apron, or rake, from undue accumulation, by permitting it to pass through the enlarged space thus provided for its escape.

Upon the seat-plank H′, arranged as described, over the elevator-apron, in convenient position to enable the operation of said apron to be observed and controlled by the attendant, as explained, I also pivot the lifting-lever M in an upright, N, on the seat-plank, the rear end or arm of said lever extending into convenient position to be operated by the driver in his seat, and held at any desired point by a notched or spurred segment-rack, N′, with which the lever is held engaged by a spring. The forward end of the lever is connected, by means of links $n$ $n^1$, and lever $n^2$, with the pivoted tongue, and through said connection the driver can readily raise the cutters for passing obstructions, or depress them for picking up fallen grain.

Ordinarily, when the grain is in suitable condition for binding, it is delivered, the long straw to the receiving fingers F′, and the shattered grain and short heads into the receptacle F, which also constitutes the binders' platform in such case, as already explained; but when the grain has been allowed to become rotted, or too ripe to be safely bound on the machine, or if from any other cause it is preferred not to bind it on the machine, I provide for its delivery into a cart or wagon body, arranged or driven by the side of the machine, by the employment of a second elevator and discharging-apron, $C^3$, which receives it from the first elevator rake or apron, $C^1$, after first permitting the short heads and shattered grain to escape between them over the inclined shield E E′ into the receptacle F. The elevator-apron $C^1$ is provided with slats having V-shaped notches, and the upper end of the delivery-board E is provided with similar notches, both matching hubs, rings, or ferrules *d* on the intermediate roller D, which, being rotated in the same direction with the elevator-apron, by any suitable arrangement of band and pulleys or gearing, causes the rings or hubs *d*, which enter the notches in the slats, to pick up the grain off the slats and apron, and to discharge it upon the delivery-board E. The latter operation is facilitated by the notched upper edge of the delivery-board forming fingers or projecting spurs *e* thereon, which enter the depressions and effectually remove the grain.

The secondary apron-frame is connected, by links or rods and straps O *o*, with the main or first elevator-frame, in any suitable manner, so that it may be readily applied or removed, and is provided with a spring-board, P, and rods *p*, as represented.

The lower end of the secondary apron $C^3$ is arranged sufficiently near the shield E to take the long straw, and yet sufficiently removed therefrom to permit the escape into receptacle F of the shattered grain and heads, or the space between the shield and the secondary apron may be increased and bridged by fingers which carry the straw to the apron, but permit the shattered grain and heads to pass between them into the receptacle F.

Having now described my invention, what I claim as new, and desire to secure by Letters Patent, is—

1. The broad continuous elevator-apron, having its forward edge extended forward or in advance of the platform-apron or carrier, and operating in combination therewith, substantially as described.

2. The roller J′, in combination with the yielding spring-board J, substantially as and for the purpose set forth.

3. The compressor for holding the grain down upon the elevator-apron, suspended in position by springs, as described, in combination with a lifting-cord or its equivalent, whereby the driver is enabled, while the machine is in operation, to relieve the pressure of said cover, for permitting the passage of accumulations of grain, substantially as described.

4. The lifting-roller K, in combination with the spring-board J, substantially as and for the purpose set forth.

5. The lifting-roller K, mounted in pivotal bearings on the seat-support, substantially as and for the purpose set forth.

6. The corrugated stripping-roller D, in combination with the elevator, substantially as and for the purpose set forth.

7. The arrangement of the secondary elevating and discharging apron $C^3$, in the described relation to the shield or delivery-board E, substantially as and for the purpose set forth.

JOHN H. ELWARD.

Witnesses:

ALEX. MAHON,

JOHN G. CENTER.